(12) United States Patent
Sun

(10) Patent No.: US 12,265,241 B2
(45) Date of Patent: Apr. 1, 2025

(54) PRIVACY FILM, PREPARATION METHOD THEREOF AND SPLICE PANEL

(71) Applicant: TCL CHINA STAR OPTOELECTRONICS TECHNOLOGY CO., LTD., Guangdong (CN)

(72) Inventor: Hejing Sun, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/758,983

(22) PCT Filed: Jun. 24, 2022

(86) PCT No.: PCT/CN2022/101068
§ 371 (c)(1),
(2) Date: Jul. 17, 2022

(87) PCT Pub. No.: WO2023/231095
PCT Pub. Date: Dec. 7, 2023

(65) Prior Publication Data
US 2024/0192411 A1 Jun. 13, 2024

(30) Foreign Application Priority Data
May 31, 2022 (CN) .......................... 202210611826.6

(51) Int. Cl.
*G02B 5/18* (2006.01)

(52) U.S. Cl.
CPC ......... *G02B 5/1819* (2013.01); *G02B 5/1852* (2013.01)

(58) Field of Classification Search
None
See application file for complete search history.

(56) References Cited

U.S. PATENT DOCUMENTS

| 2002/0163728 | A1 | 11/2002 | Myers | |
| 2020/0033515 | A1* | 1/2020 | Li | G02B 5/201 |
| 2022/0171221 | A1* | 6/2022 | Hsieh | G02F 1/133504 |
| 2022/0413203 | A1* | 12/2022 | Fattal | G02F 1/133615 |
| 2023/0314673 | A1* | 10/2023 | Chang | G02B 5/0221 |
| | | | | 359/569 |

FOREIGN PATENT DOCUMENTS

| CN | 108493223 A | 9/2018 |
| CN | 209191400 U | 8/2019 |

(Continued)

OTHER PUBLICATIONS

International Search Report in International application No. PCT/CN2022/101068,mailed on Dec. 21, 2022.

(Continued)

*Primary Examiner* — Robert E. Tallman
(74) *Attorney, Agent, or Firm* — PV IP PC; Wei Te Chung

(57) ABSTRACT

Embodiments of the present application disclose a privacy film, a preparation method thereof and a splice panel. The privacy film includes a substrate and a plurality of gratings disposed on the substrate, wherein the plurality of gratings are spaced in a first direction and a second direction, and the first direction intersects the second direction.

20 Claims, 10 Drawing Sheets

(56) References Cited

FOREIGN PATENT DOCUMENTS

| | | |
|---|---|---|
| CN | 209525640 U | 10/2019 |
| CN | 111239870 A | 6/2020 |
| CN | 111290056 A | 6/2020 |
| CN | 111323982 A | 6/2020 |
| CN | 111458923 A | 7/2020 |
| CN | 112310182 A | 2/2021 |
| CN | 112848581 A | 5/2021 |
| CN | 113270049 A | 8/2021 |
| CN | 113325632 A | 8/2021 |
| CN | 113485047 A | 10/2021 |
| CN | 214937180 U | 11/2021 |
| CN | 215730616 U | 2/2022 |
| CN | 114137753 A | 3/2022 |
| CN | 114335072 A | 4/2022 |
| CN | 114966928 A | 8/2022 |
| CN | 114973982 A | 8/2022 |
| JP | 2005107306 A | 4/2005 |
| JP | 2013205513 A | 10/2013 |

OTHER PUBLICATIONS

Written Opinion of the International Search Authority in International application No. PCT/CN2022/101068, mailed on Dec. 21, 2022.

Chinese Office Action issued in corresponding Chinese Patent Application No. 202210611826.6 dated May 19, 2023, pp. 1-8.

Chinese Office Action issued in corresponding Chinese Patent Application No. 202210611814.3 dated May 16, 2023, pp. 1-7.

International Search Report in International application No. PCT/CN2022/102366, mailed on Dec. 19, 2022.

Written Opinion of the International Search Authority in International application No. PCT/CN2022/102366, mailed on Dec. 19, 2022.

\* cited by examiner

PRIVACY FILM, PREPARATION METHOD THEREOF AND SPLICE PANEL

TECHNICAL FIELD

The present application relates to a technical field of display technology, and in particular to a privacy film, a preparation method thereof, and a splice panel.

BACKGROUND

In a splice panel with a liquid crystal panel and a LED (light-emitting diode) panel, an overall quality of a side view of the splice panel is affected due to a greater side-view brightness of the LED panel.

During research and practice to the prior art, the inventors of the present application have found that if the LED panel is attached with the existing privacy film, the side view of the LED panel at a certain angle will be black.

Technical Problems

Embodiments of the present application provide a privacy film, a preparation method thereof, and a splice panel, which can reduce side-view brightness.

SUMMARY

Embodiments of the present application provide a privacy film comprising:
  a substrate; and
  a plurality of gratings disposed on the substrate, wherein the plurality of gratings are spaced in a first direction and a second direction, and the first direction intersects the second direction.

Alternatively, in some embodiments of the present application, each of the plurality of gratings extends in the first direction.

Alternatively, in some embodiments of the present application, the privacy film further comprises a connecting body, the connecting body is connected between two adjacent gratings in the first direction, and a thickness of the connecting body is less than a thickness of the grating.

Alternatively, in some embodiments of the present application, the plurality of gratings include a plurality of first gratings and a plurality of second gratings, wherein the plurality of first gratings are spaced in the first direction and the second direction, and each of the plurality of first gratings extends in the first direction;
  where the plurality of the second gratings are spaced in the first direction and the second direction, and each of the plurality of second gratings extends in the second direction.

Alternatively, in some embodiments of the present application, the first grating is connected to the second grating.

Alternatively, in some embodiments of the present application, a first opening is spaced between two adjacent first gratings in the first direction; and a second opening is spaced between two adjacent second gratings in the second direction;
  wherein a plurality of first openings are arranged in the second direction to form a first optical channel; and a plurality of second openings are arranged in the first direction to form a second optical channel.

Alternatively, in some embodiments of the present application, the first grating is spaced from the second grating.

Alternatively, in some embodiments of the present application, a first opening is spaced between two adjacent first gratings in the first direction; and the second grating is disposed between two adjacent first openings in the second direction;
  wherein a second opening is spaced between two adjacent second gratings in the second direction; and the first grating is disposed between two adjacent second openings in the first direction.

Alternatively, in some embodiments of the present application, a width of a first opening is greater than a width of the second grating in the first direction;
  wherein a plurality of first openings are arranged to form at least one first optical channel in the second direction.

Alternatively, in some embodiments of the present application, a width of a second opening is greater than a width of the first grating in the second direction;
  wherein a plurality of second openings are arranged to form at least one second optical channel in the first direction.

Alternatively, in some embodiments of the present application, a plurality of hollowed-out regions are provided in areas where the first opening and the second opening overlap, the hollowed-out regions are arranged in a third direction to form a third optical channel, and the hollowed-out regions are arranged in a fourth direction to form a fourth optical channel;
  wherein the first direction, the second direction, the third direction, and the fourth direction intersect each other.

Alternatively, in some embodiments of the present application, a length of the first grating is equal to a length of the second grating, and a length of the first opening in the first direction is equal to a length of the first opening in the second direction.

Alternatively, in some embodiments of the present application, the privacy film comprises a first region located in a middle region and a second region disposed on both sides of the first region, and a density of the plurality of gratings located in the first region is less than a density of the plurality of gratings located in the second region.

Accordingly, embodiments of the present application also provide a preparation method of privacy film comprising:
  forming an adhesive layer on a substrate;
  forming a grating material layer on the adhesive layer; and
  punching the grating material layer to form a plurality of gratings.

Accordingly, embodiments of the present application further provide a splice panel comprising:
  at least two first panels, wherein the at least two first panels are spliced, and a gap is provided between two adjacent first panels; and
  at least one second panel, wherein the at least one second panel is disposed on two adjacent first panels and shields the gap;
  wherein the second panel includes a panel body and a privacy film as described in any of the above embodiments, wherein the privacy film is disposed on the panel body, and a side-view brightness of the panel body is greater than a side-view brightness of the first panel;
  wherein a splicing direction of two adjacent first panels intersects a first direction.

Alternatively, the privacy film comprises:

a substrate;

a plurality of gratings disposed on the substrate, wherein the plurality of gratings are spaced in a first direction and a second direction, and the first direction intersects the second direction.

Alternatively, in some embodiments of the present application, each of the plurality of gratings extends in the first direction.

Alternatively, in some embodiments of the present application, the privacy film further comprises a connecting body, the connecting body is connected between two adjacent gratings in the first direction, and a thickness of the connecting body is less than a thickness of the grating.

Alternatively, in some embodiments of the present application, the plurality of gratings include a plurality of first gratings and a plurality of second gratings, wherein the plurality of first gratings are spaced in the first direction and the second direction, and each of the plurality of first gratings extends in the first direction;

wherein the plurality of the second gratings are spaced in the first direction and the second direction, and each of the plurality of second gratings extends in the second direction.

Alternatively, in some embodiments of the present application, the first grating is connected to the second grating.

Alternatively, in some embodiments of the present application, a first opening is spaced between two adjacent first gratings in the first direction; and a second opening is spaced between two adjacent second gratings in the second direction;

wherein a plurality of first openings are arranged in the second direction to form a first optical channel; and a plurality of second openings are arranged in the first direction to form a second optical channel.

Beneficial Effects

Embodiments of the present application disclose a privacy film, a preparation method thereof and a splice panel. The privacy film includes a substrate and a plurality of gratings disposed on the substrate, wherein the plurality of gratings are spaced in a first direction and a second direction, and the first direction intersects the second direction.

In the embodiment of the present application, a plurality of gratings are spaced in the first direction and the second direction, respectively, so that the side-view brightness can be reduced.

BRIEF DESCRIPTION OF THE DRAWINGS

In order to more clearly describe the technical solutions in the embodiments of the present application, the accompanying drawings required in the description of the embodiments will be briefly described below. It is obvious that the accompanying drawings in the following description are merely some embodiments of the present application, and other drawings may be obtained by those skilled in the art without creative efforts.

DETAILED DESCRIPTION OF THE EMBODIMENTS

Figure 1:
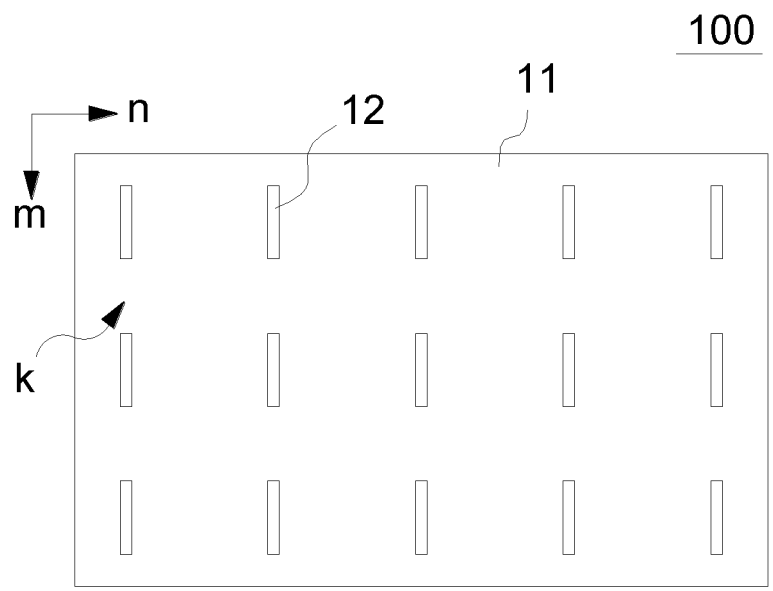
FIG. 1 is a schematic top view structural diagram of a privacy film according to a first embodiment of the present application.

The technical solutions in the embodiments of this application will be clearly and completely described below in conjunction with the accompanying drawings in the embodiments of this application. It is clear that the described embodiments are only some but not all of the embodiments of this application. Based on the embodiments of the present application, all other embodiments obtained by a person skilled in the art without creative efforts are within the scope of the present application. In addition, it should be understood that the specific embodiments described herein are merely intended to illustrate and explain the present application, and are not intended to limit the present application. In the present application, unless otherwise stated, the directional words used such as "upper" and "lower" generally refer to the upper and lower sides of the device in actual use or working state, specifically the drawing direction in the accompanying drawings; while "inside" and "outside" refer to the outline of the device.

Embodiments of the present application provide a privacy film, a preparation method thereof, and a splice panel, which are described in detail below. It should be noted that the order of description of the following embodiments is not a limitation on the preferred order of the embodiments.

It should be noted that, Alternatively, the splice panel includes at least two first panels and at least one second panel. The at least two first panels are spliced, and a gap is provided between two adjacent first panels. The second panel is disposed on two adjacent first panels and shields the gap. The second panel includes a panel body and a privacy film. The privacy film is disposed on the panel body. A front-view brightness of the panel body is greater than a front-view brightness of the first panel.

Referring to FIG. 1, a first embodiment of the present application provides a privacy film 100 including a substrate 11 and a plurality of gratings 12.

The plurality of gratings 12 are disposed on the substrate 11. The plurality of gratings 12 are spaced apart in a first direction m. The plurality of gratings are spaced apart in a second direction n. The first direction m intersects the second direction n.

According to the first embodiment of the present application, the plurality of gratings 12 are spaced apart in the first direction m and the second direction n, respectively, so that a side-view brightness can be reduced when the privacy film is applied to the panel.

The gratings 12 are spaced apart in the first direction m and the second direction n, that is, an opening k is provided between adjacent gratings 12. When the privacy film is applied to the panel, a part of the lights from a side view can pass through the opening k, and a part of the lights is blocked by the grating 12 to reduce the side-view brightness. As the side-view brightness fails to reach to zero, that is, there is still visibility from the side view.

Alternatively, the first direction m is perpendicular to the second direction n. In some embodiments, the first direction m is not perpendicular to the second direction n.

Alternatively, the material of the substrate 11 may be a hard substrate or a flexible substrate. The material of the substrate 11 includes one of glass, sapphire, silicon, silicon dioxide, polyethylene, polypropylene, polystyrene, polylactic acid, polyethylene dicarboxylate, polyethylene terephthalate, polyethylene naphthalate, polycarbonate, polyethersulfone, aromatic fluorotoluene containing polyarylate, polycyclic olefin, polyimide or polyurethane.

Alternatively, a plurality of gratings 12 extend in the first direction m. A length of the grating 12 in the first direction m is greater than a width in the second direction n, so that more lights from the side view can be blocked in the first direction m when the privacy film is applied to the panel. Thus, the side-view brightness in the first direction m is less than the side-view brightness in the second direction n. Since the side-view brightness in the first direction m and the second direction n is different, the privacy film can be attached in different directions according to different requirements, thereby increasing the applicability of the privacy film.

Alternatively, in the first direction m, a width of the opening between two adjacent gratings 12 is a first width. In the second direction n, a width of the opening between two adjacent gratings is a second width. The first width is smaller than the second width. When the privacy film is applied to the panel, more lights from the side view are passed through in the second direction n, so that the side-view brightness in the first direction m is less than the side-view brightness in the second direction n.

Alternatively, the material of the grating 12 may be a black light-opaque material, for example, an inorganic metal material such as Cr (chromium), Mo (molybdenum), Mn (manganese), or the like, or a metal oxide material such as CrOx, MoOx, MnO2, or the like, or a mixed material formed of a metal and a metal oxide. The material of the grating 12 may also be an organic black resin material such as black polystyrene, black photoresist, or the like.

Alternatively, the shape of the grating 12 may be rectangular, trapezoidal or other.

Alternatively, the width of the grating 12 is greater than or equal to 8 μm, such as 8 μm, 9 μm, or 10 μm. The length of the grating 12 is ranging from 35 μm to 75 μm, such as 35 μm, 45 μm, 55 μm, 65 μm or 75 μm. The thickness of the grating is ranging from 50 μm to 130 μm, such as 50 μm, 70 μm, 90 μm, 110 μm or 130 μm.

Alternatively, the plurality of gratings 12 are uniformly disposed in the privacy film 100.

Figure 2:
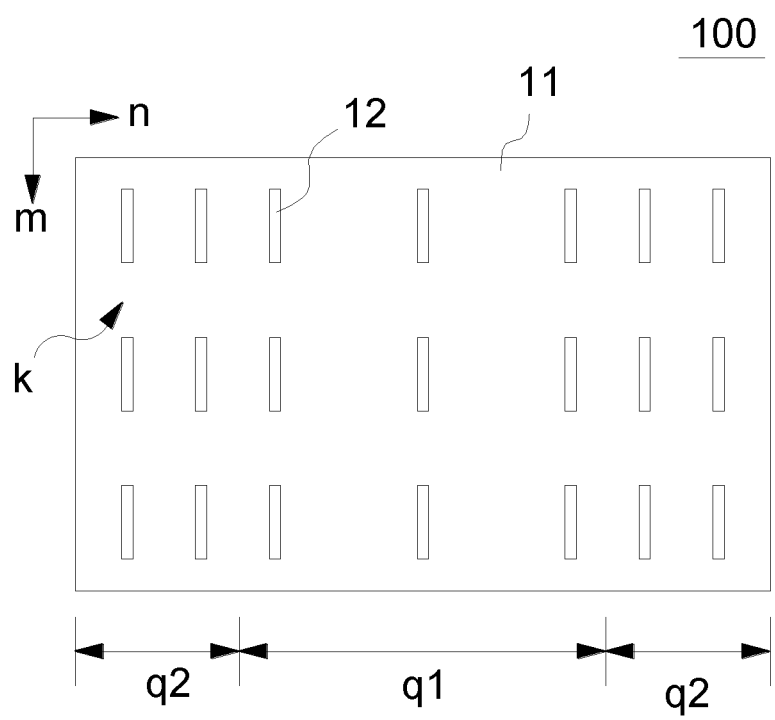
FIG. 2 is another schematic top view structural diagram of a privacy film according to a first embodiment of the present application.

Alternatively, referring to FIG. 2, in another schematic top view structural diagram of the first embodiment, the privacy film 100 includes a first region q1 located in a middle region and a second region q2 disposed on both sides of the first region q1. A density of the grating 12 located in the first region q1 is less than a density of the grating 12 located in the second region q2.

When the privacy film 100 of this embodiment is applied to the splice panel, the gratings 12 are disposed in different densities across the privacy film. Thus, front-view brightness of the first region q1 is greater than the front-view brightness of the second region q2. Further, the overall brightness of the splice panel is smoothly transitioned.

Alternatively, in the second direction n, a distance between adjacent gratings 12 located in the first region q1 is greater than a distance between adjacent gratings 12 located in the second region q2.

Alternatively, heights of the gratings 12 located in the first region q1 are less than heights of the gratings 12 located in the second region q2. As such, the side-view brightness in the first region q1 is greater than the side-view brightness in the second region q2 when the privacy film is applied to the panel.

The height direction is a direction perpendicular to the plane mn.

Figure 3:
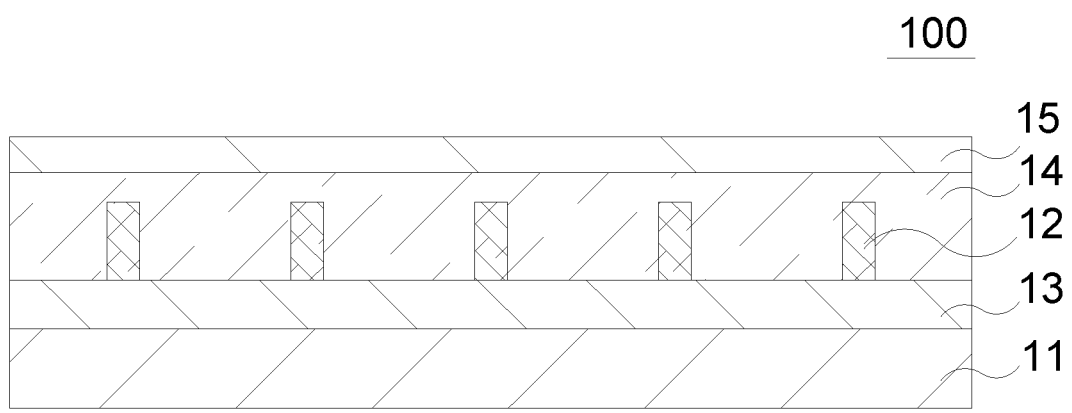
FIG. 3 is a schematic cross-sectional diagram of a privacy film according to a first embodiment of the present application.

Alternatively, referring to FIG. 3, the privacy film 100 further includes a first adhesive layer 13, a second adhesive layer 14, and a protective layer 15. The first adhesive layer 13 is disposed on the substrate 11. The gratings 12 are disposed on the first adhesive layer 13. The second adhesive layer 14 is disposed on the gratings 12. The protective layer 15 is disposed on the second adhesive layer.

The gratings 12 in the privacy film 100 are formed by a punching process.

Figure 4:
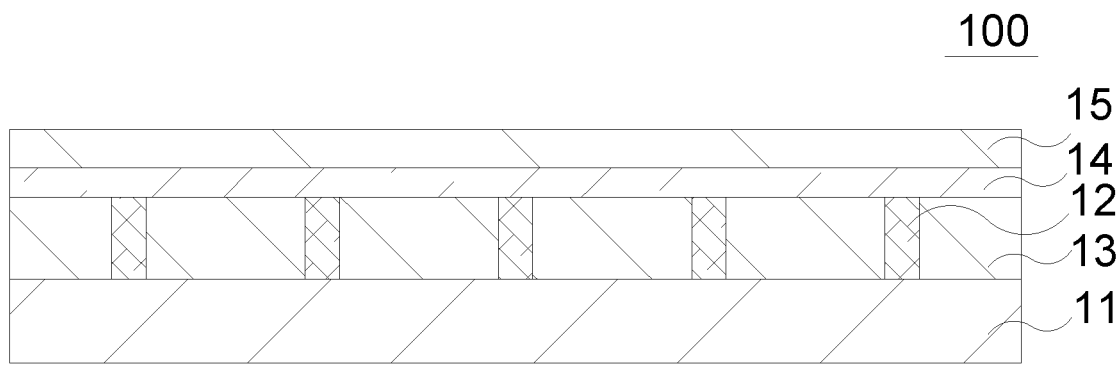
FIG. 4 is another schematic cross-sectional diagram of a privacy film according to a first embodiment of the present application.

In another structure of the first embodiment of the present application, referring to FIG. 4, the privacy film 100 also includes a first adhesive layer 13, a second adhesive layer 14, and a protective layer 15. The first adhesive layer 13 is disposed on the substrate 11. The first adhesive layer 13 is provided with a plurality of receiving ports in which the gratings 12 are disposed. The second adhesive layer 14 covers the first adhesive layer 13 and the gratings 12. The protective layer 15 is disposed on the second adhesive layer 14.

The gratings 12 in the privacy film 100 are formed by a transfer process.

Figure 5:
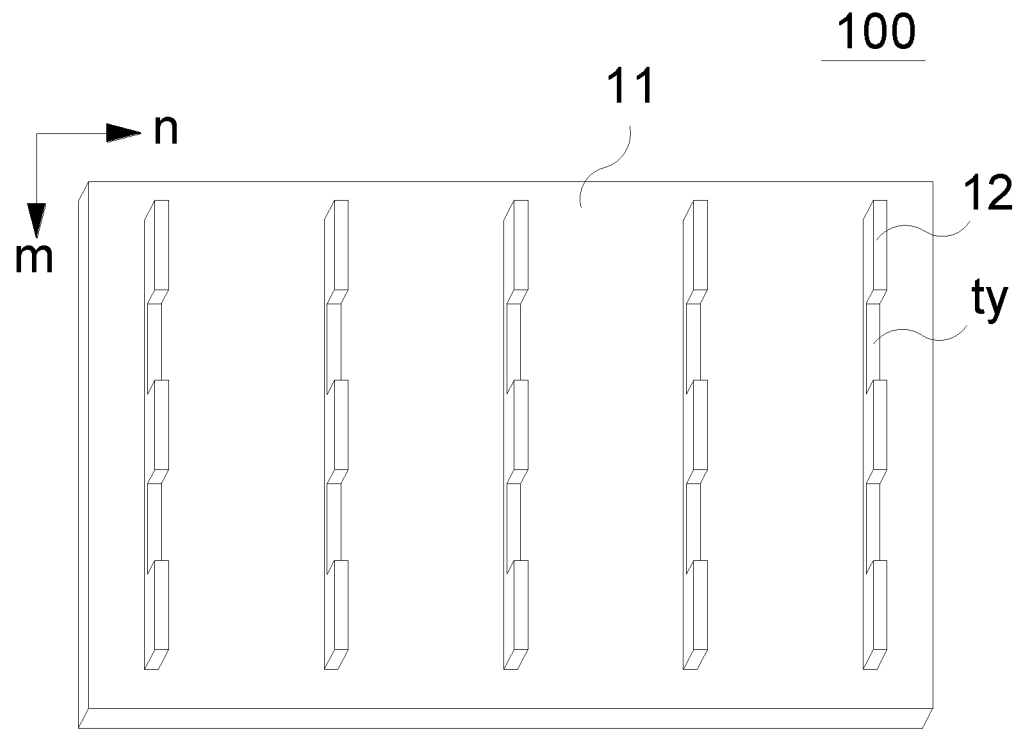
FIG. 5 is a schematic top view structural diagram of a privacy film according to a second embodiment of the present application.

Referring to FIG. 5, based on the first embodiment of the present application, the privacy film 100 of the second embodiment further includes a connector ty. In the first direction m, the connecting body ty is connected between two adjacent gratings 12. The height of the connecting body ty is less than the height of the grating 12.

The connecting body ty with a lower height is connected between adjacent gratings 12. When the transfer process is used, the gratings 12 are easily demolded. In addition, the connecting body ty may block a part of the lights from the large viewing angle, and thereby further reducing the brightness of the large viewing angle.

Alternatively, the connecting body ty is disposed in a same layer as the gratings 12 and integrally formed. The material of the connecting body ty is the same as the material of the gratings 12.

Figure 6:
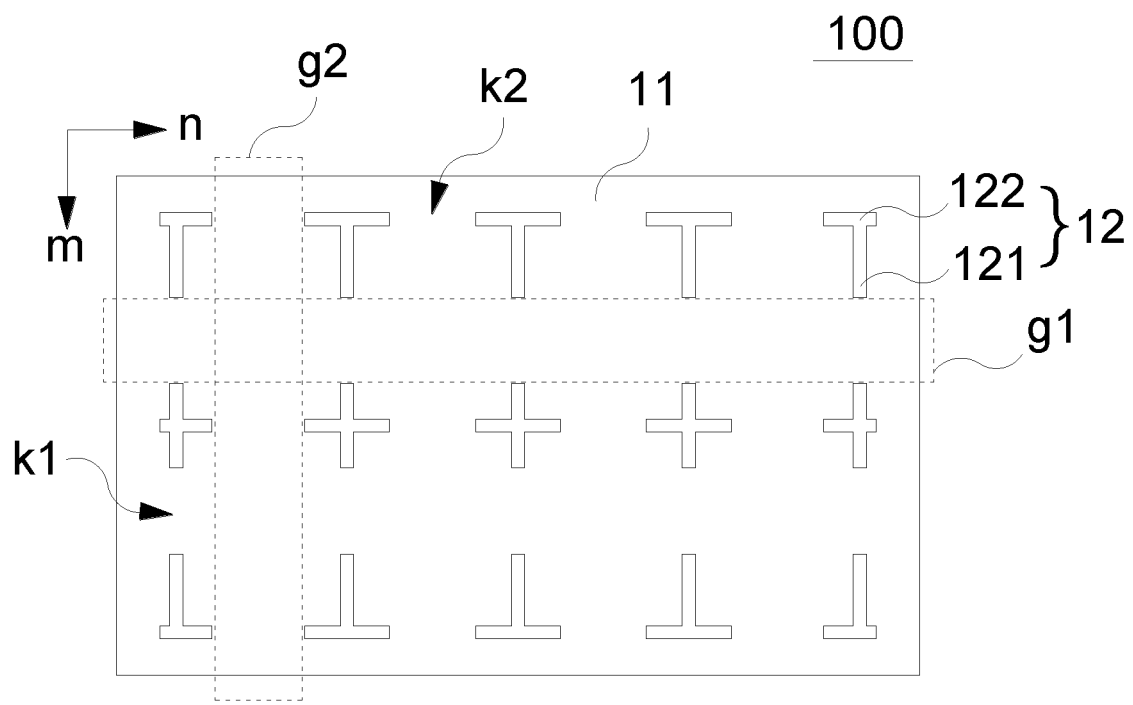
FIG. 6 is a schematic top view structural diagram of a privacy film according to a third embodiment of the present application.

Referring to FIG. 6, based on the first embodiment, the gratings 12 of the privacy film 100 of the third embodiment includes two forms.

The plurality of gratings 12 includes a plurality of first gratings 121 and a plurality of second gratings 122. The plurality of first gratings 121 extend in the first direction m. The plurality of first gratings 121 are spaced apart in the first direction m. The plurality of first gratings 121 are spaced apart in the second direction n.

The plurality of second gratings 122 extend in the second direction n. The plurality of second gratings 122 are spaced apart in the first direction m. The plurality of second gratings 122 are spaced apart in the second direction n.

The privacy film 100 of the third embodiment is cooperatively provided with the first gratings 121 and the second gratings 122, and thereby further reducing the side-view brightness in the first direction m.

Alternatively, the first grating 121 is connected to the second grating 122. That is, a first grating 121 intersects a second grating 122.

In the first direction m, a first opening k1 is provided between two adjacent first gratings 121. In the second direction n, a second opening k2 is provided between two adjacent second gratings 122.

A plurality of first openings k1 are arranged in the second direction n to form a first optical channel g1. A plurality of second openings k2 are arranged in the first direction m to form a second optical channel g2.

According to the privacy film 100 of the third embodiment, the first gratings 121 and the second gratings 122 are adjacent and intersected respectively, to form a plurality of first channels g1 and a plurality of second channels g2. When the privacy film 100 is applied to the panel, the side-view brightness of the privacy film 100 in the first direction m and the second direction n tends to be balanced.

Figure 7:
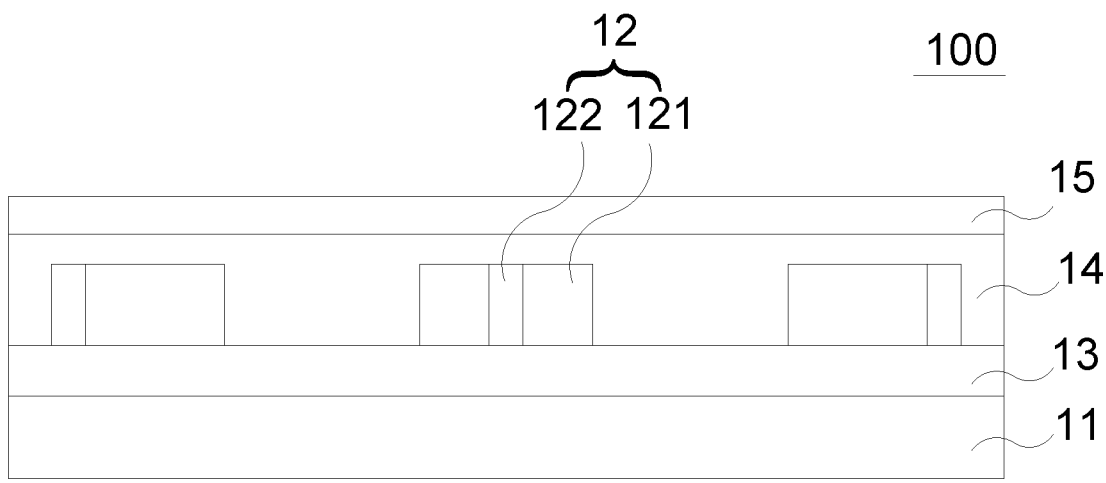
FIG. 7 is a schematic side view structural diagram of a privacy film according to a third embodiment of the present application.

Alternatively, referring to FIG. 7, the privacy film 100 further includes a first adhesive layer 13, a second adhesive layer 14, and a protective layer 15. The first adhesive layer 13 is disposed on the substrate 11. The first grating 121 and the second grating 122 are connected to each other, and disposed on the first adhesive layer 13. The second adhesive layer 14 is disposed on the grating 12. The protective layer 15 is disposed on the second adhesive layer.

The gratings 12 in the privacy film 100 are formed by a punching process.

Figure 8:
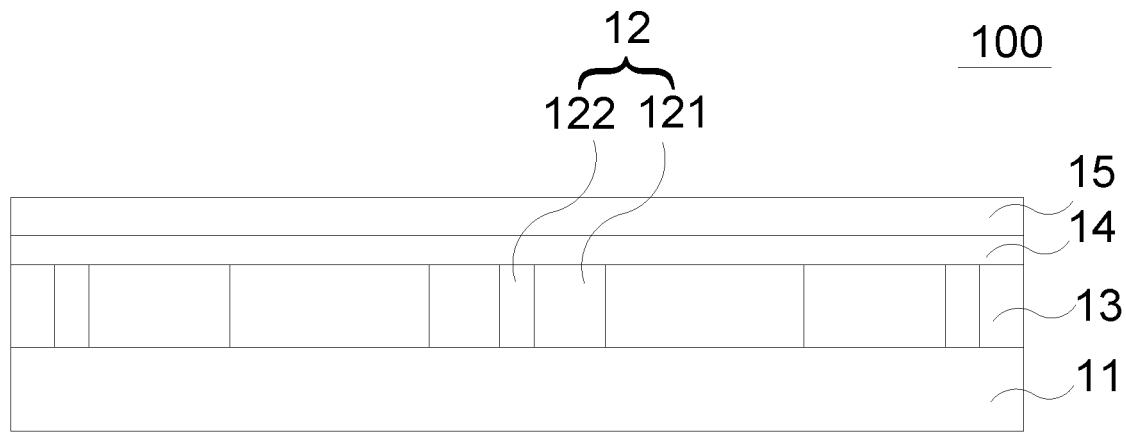
FIG. 8 is another schematic side view structural diagram of a privacy film according to a third embodiment of the present application.

In another structure of the first embodiment of the present application, referring to FIG. 8, the privacy film 100 also includes a first adhesive layer 13, a second adhesive layer 14, and a protective layer 15. The first adhesive layer 13 is disposed on the substrate 11. The first adhesive layer has a plurality of receiving ports, and the first gratings 121 and the second gratings 122 are connected within the receiving ports. The second adhesive layer 14 covers the first adhesive layer 13 and the grating 12. The protective layer 15 is disposed on the second adhesive layer 14.

The gratings 12 in the privacy film 100 are formed by a transfer process.

Figure 9:
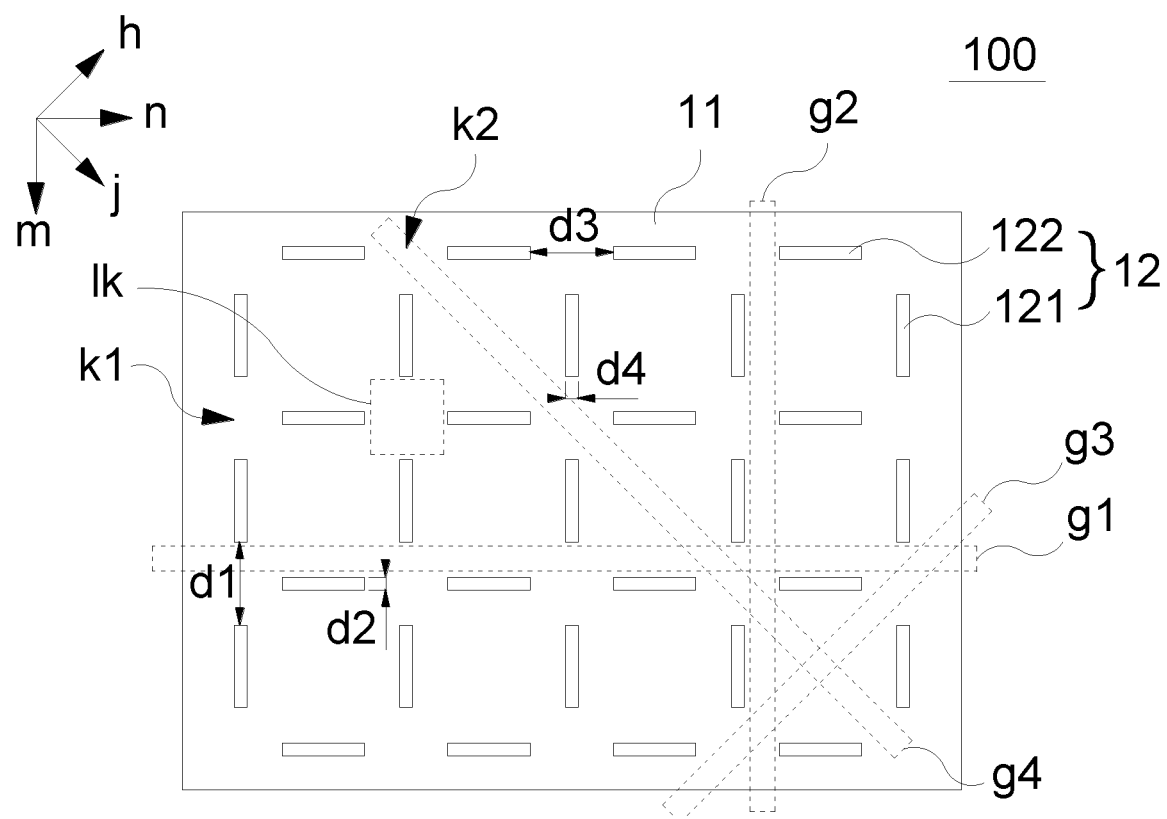
FIG. 9 is a schematic top view structural diagram of a privacy film according to a fourth embodiment of the present application.

Referring to FIG. 9, the privacy film 100 in the fourth embodiment differs from the third embodiment in that the first gratings 121 and the second gratings 122 are spaced apart.

The first gratings 121 and the second gratings 122 in the fourth embodiment are spaced apart, so that the number of optical channels is increased.

In the first direction m, a first opening k1 is provided between two adjacent first gratings 121. In the second direction n, the second grating 122 is disposed between two adjacent first openings k1.

In the second direction n, a second opening k2 is provided between two adjacent second gratings 122. In the first direction m, the first grating 121 is disposed between two adjacent second openings k2.

In the fourth embodiment, the first grating 121 corresponds to the second opening k2, and the second grating 122 corresponds to the first opening k1, which improves the balance of the lights passing through the privacy film 100.

In some embodiments, the first grating 121 may also be spaced between the two second gratings 122. The second grating 122 may be spaced between the two first gratings 121.

Alternatively, in the fourth embodiment, in the first direction m, the length d1 of the first opening k1 is greater than the width d2 of the second grating 122. In the second direction n, a plurality of first openings k1 are arranged to form at least one first optical channel g1.

In the fourth embodiment, lines connecting centers of the first openings k1 and centers of the second gratings 122 extend in the second direction n. In the second direction n, the optical channel formed by the plurality of first openings k1 is divided into two first optical channels g1 by the second gratings 122 to improve the uniformity of the lights passing through.

Alternatively, in the second direction n, the length d3 of the second opening k2 is greater than the width d4 of the first grating 121.

In the first direction m, a plurality of second openings k2 are arranged to form at least one second optical channel g2.

In the fourth embodiment, lines connecting centers of the second opening k2 and centers of the first grating 121 extend in the first direction m. In the first direction m, the optical channel formed by the plurality of second openings k2 is divided into two second optical channels g2 by the first grating 121 to improve the uniformity of the lights passing through.

Figure 10:
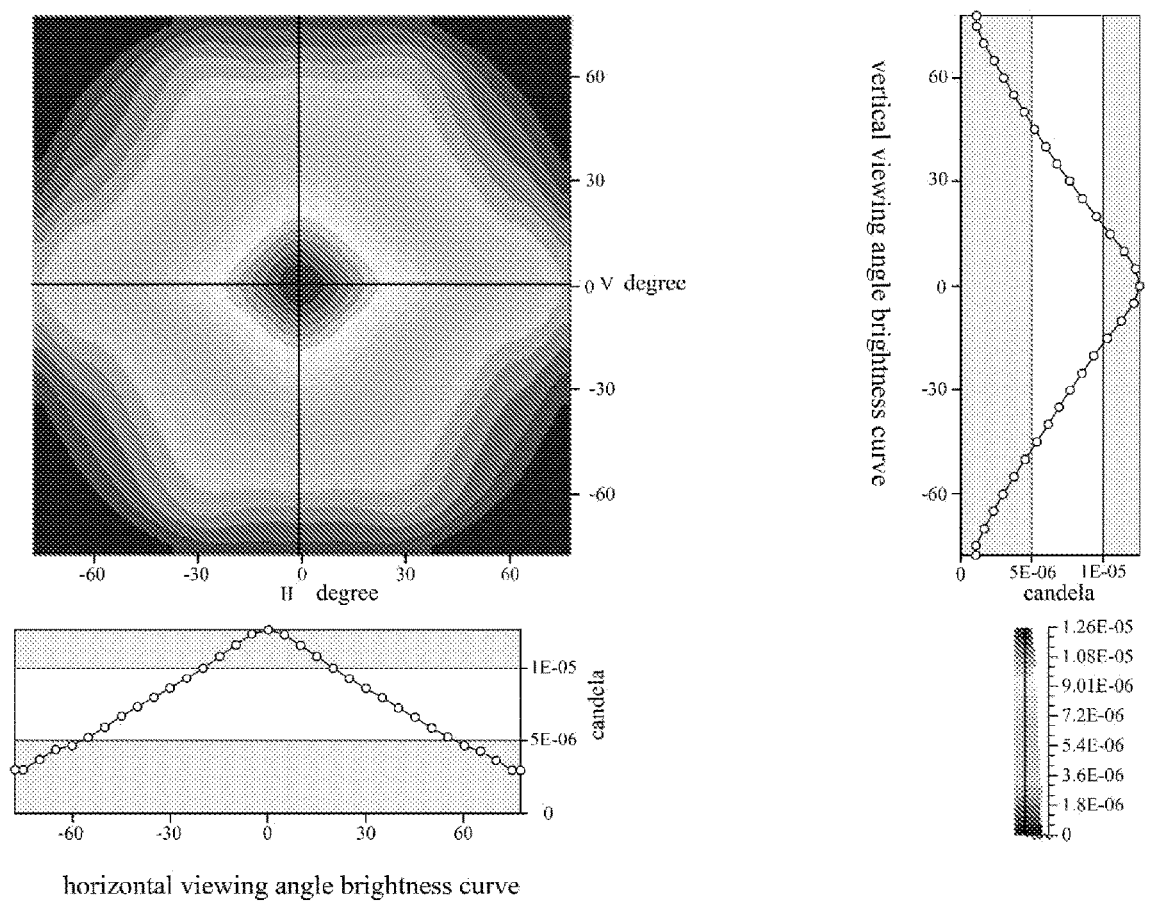
FIG. 10 is a schematic diagram of a pseudo-true viewing angle-brightness of a privacy film according to a fourth embodiment of the present application.

The fourth embodiment uniformly increases the optical channels in the first direction m and the second direction n, so that the luminance curves of the privacy film 100 coincide in the horizontal viewing angle and the vertical viewing angle, as shown in FIG. 10.

Alternatively, a plurality of hollowed-out regions Ik are provided in areas where the first opening k1 and the second opening k2 overlap. The hollowed-out regions Ik are arranged in a third direction h to form a third optical channel g3. The hollow regions Ik are arranged in a fourth direction j to form a fourth optical channel g4.

Alternatively, the first openings k1 and the second openings k2 are of equal size. The first direction m, the second direction n, the third direction h, and the fourth direction j intersect each other.

Alternatively, the third direction h is perpendicular to the fourth direction j. The length of the first grating 121 is equal to the length of the second grating 122. The width d2 of the first grating 121 is equal to the width d4 of the second grating 122. The length d1 of the first opening k1 in the first direction m is equal to the length of the first opening k1 in the second direction n. The length d1 of the first opening k1 is equal to the length d3 of the second opening k2. In the first direction m, a plurality of second gratings 122 are disposed coaxially, and a plurality of first gratings 121 are disposed coaxially. In the second direction n, a plurality of first gratings 121 are disposed coaxially, and a plurality of second gratings 122 are disposed coaxially.

In the fourth embodiment, a plurality of third optical channels g1 and a plurality of fourth optical channels g4 are provided to increase the luminance brightness of the oblique viewing angle, so that the brightness of the oblique viewing angle corresponds as much as possible to the brightness of the horizontal viewing angle and the vertical viewing angle, respectively, as shown in FIG. 10.

It should be noted that the pseudo-true diagram of FIG. 10 is a diagram of the relationship between the brightness and the viewing angle obtained by the pseudo-true method when the privacy film 100 of the fourth embodiment is applied to the LED panel.

Figure 11:
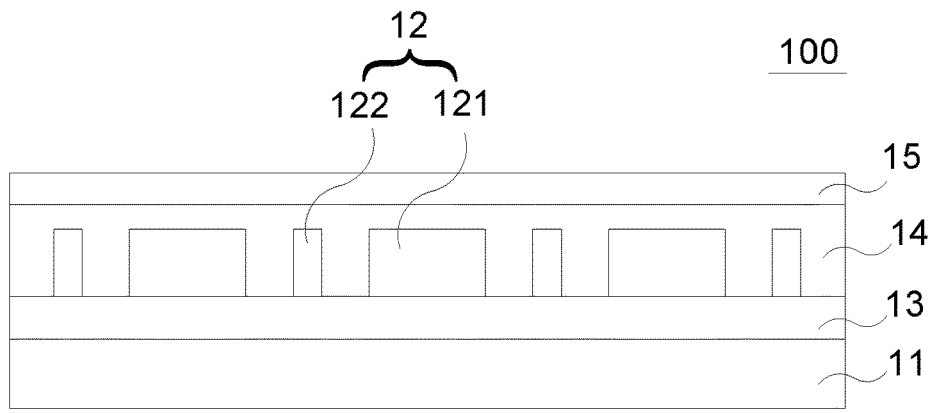
FIG. 11 is a schematic side view structural diagram of a privacy film according to a fourth embodiment of the present application.

Alternatively, referring to FIG. 11, the privacy film 100 further includes a first adhesive layer 13, a second adhesive layer 14, and a protective layer 15. The first adhesive layer 13 is disposed on the substrate 11. The first gratings 121 and the second gratings 122 are spaced on the first adhesive layer 13. The second adhesive layer 14 is disposed on the gratings 12. The protective layer 15 is disposed on the second adhesive layer.

The gratings 12 in the privacy film 100 are formed by a punching process.

Figure 12:
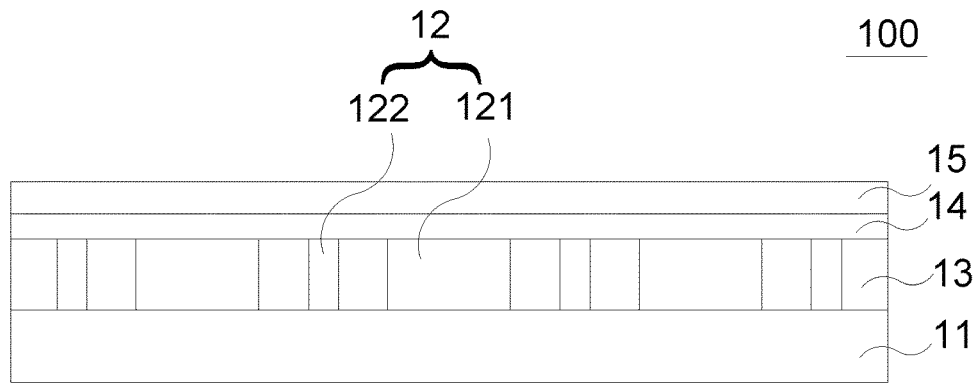
FIG. 12 is another schematic side view structural diagram of a privacy film according to a fourth embodiment of the present application.

In another structure of the first embodiment of the present application, referring to FIG. 12, the privacy film 100 also includes a first adhesive layer 13, a second adhesive layer 14, and a protective layer 15. The first adhesive layer 13 is disposed on the substrate 11. The first adhesive layer has a plurality of first receiving ports and a plurality of second receiving ports. The first gratings 121 are disposed in the first receiving ports. The second grating 122 are disposed in the second receiving ports. The second adhesive layer 14 covers the first adhesive layer 13 and the gratings 12. The protective layer 15 is disposed on the second adhesive layer 14.

The gratings 12 in the privacy film 100 are formed by a transfer process.

In some embodiments, the first gratings 121 and the second gratings 122 may also be arranged on different layers.

Figure 13:
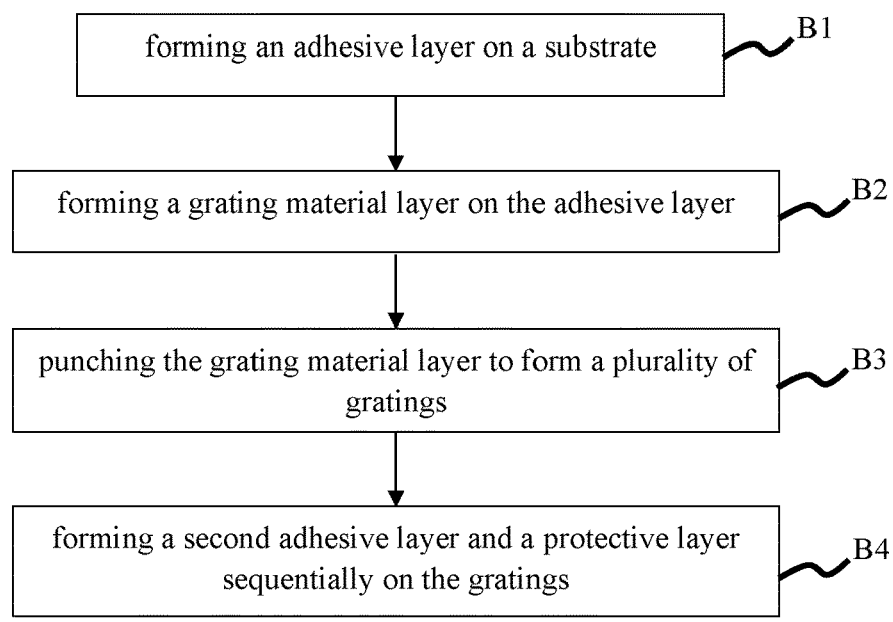
FIG. 13 is a flowchart of a preparation method of privacy film according to an embodiment of the present application.

Accordingly, referring to FIG. 13, an embodiment of the present application further provides a preparation method of privacy film, and the method comprises the followings.

Step B1, forming an adhesive layer on a substrate.

Step B2, forming a grating material layer on the adhesive layer.

Step B3, punching the grating material layer to form a plurality of gratings.

In the preparation method of the embodiment of the present application, a plurality of gratings are spaced in the first direction, and a plurality of gratings are spaced in the second direction. The first direction is intersected with the second direction. The plurality of gratings are spaced in the first direction and the second direction, respectively, and the side-view brightness can be reduced when the privacy film is applied to the panel.

In addition, the formation of the grating by the punching process is simpler than the transfer process. Even if two punching dies are used to pattern the grating material layer, all the gratings can be formed on a same layer, thereby thinning the thickness of the privacy film.

Hereinafter, the preparation method of the privacy film 100 of the fourth embodiment is described as an example, but is limited thereto.

Figure 14:
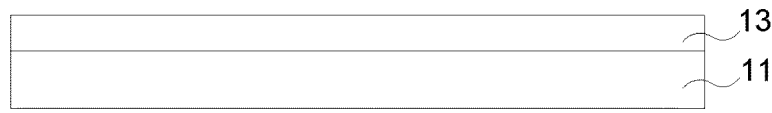
FIG. 14 is a schematic diagram of step B1 in a preparation method of privacy film according to an embodiment of the present application.

In step B1, referring to FIG. 14, an adhesive layer is formed on the substrate 11. The adhesive layer is defined as the first glue layer 13.

Alternatively, the material of the substrate 11 may be a hard substrate or a flexible substrate. The material of the substrate 11 includes one of glass, sapphire, silicon, silicon dioxide, polyethylene, polypropylene, polystyrene, polylactic acid, polyethylene dicarboxylate, polyethylene terephthalate, polyethylene naphthalate, polycarbonate, polyethersulfone, aromatic fluorotoluene containing polyarylate, polycyclic olefin, polyimide or polyurethane.

The method then proceeds to step B2.

Figure 15:
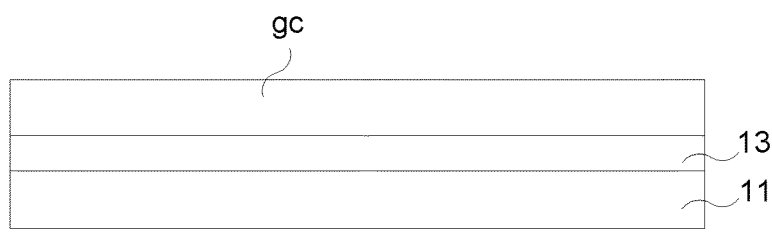
FIG. 15 is a schematic diagram of step B2 in a preparation method of privacy film according to an embodiment of the present application.

In step B2, referring to FIG. 15, a grating material layer gc is formed on the adhesive layer.

Alternatively, the grating material layer gc may be bonded to the adhesive layer 13.

Alternatively, the material of the grating material layer gc may be a black light-opaque material, for example, an inorganic metal material such as Cr (chromium), Mo (molybdenum), Mn (manganese), or the like, or a metal oxide material such as CrOx, MoOx, MnO2, or the like, or a mixed material formed of a metal and a metal oxide. The material of the grating 12 may also be an organic black resin material such as black polystyrene, black photoresist, or the like.

The method then proceeds to step B3.

Figure 16:
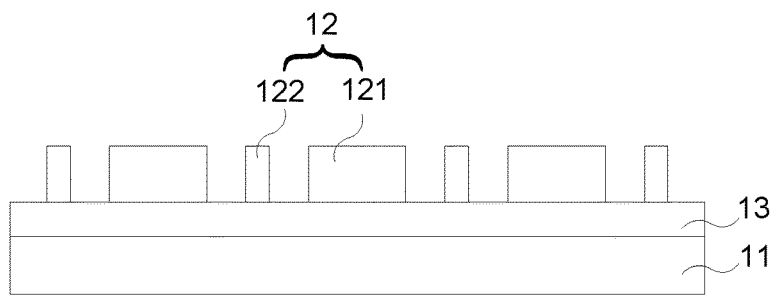
FIG. 16 is a schematic diagram of step B3 in a preparation method of privacy film according to an embodiment of the present application.

In step B3, referring to FIG. 16, the grating material layer gc is punched out to form a plurality of gratings 12.

Alternatively, step B3 includes the followings.

Step B31, forming a plurality of first gratings 121 by punching the grating material layer gc using a first punching die c1.

Step B32, forming a plurality of second gratings 122 by punching the grating material layer gc using a second punching die c2.

In step B33, removing portions of the grating material layer gc other than the first gratings 121 and the second gratings 122.

Figure 17:
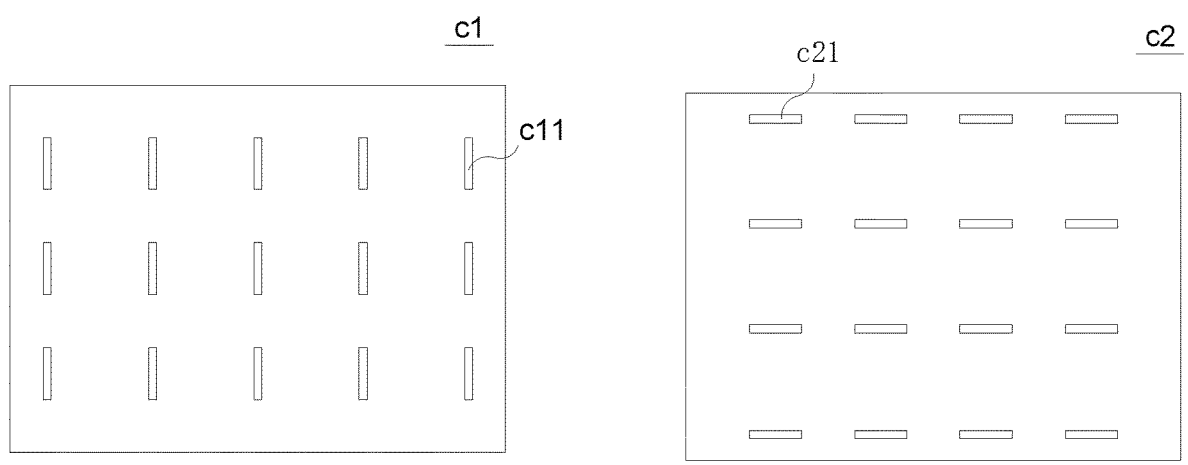
FIG. 17 is a schematic view of a first punching die and a second punching die in a preparation method of privacy film according to an embodiment of the present application.

Referring to FIG. 17, the first punching die c1 is provided with a plurality of first punching holes c11 patterned same as the plurality of first gratings 121. The second die c2 is provided with a plurality of second punching holes c21 patterned same as the plurality of second gratings 122.

In some embodiments, the grating material layer gc may also be punched using a punching die to form a plurality of first gratings 121 and a plurality of second gratings 122. Another punching dies are saved.

The preparation method of privacy film 100 according to the embodiment of the present application further comprises step B4.

Figure 18:
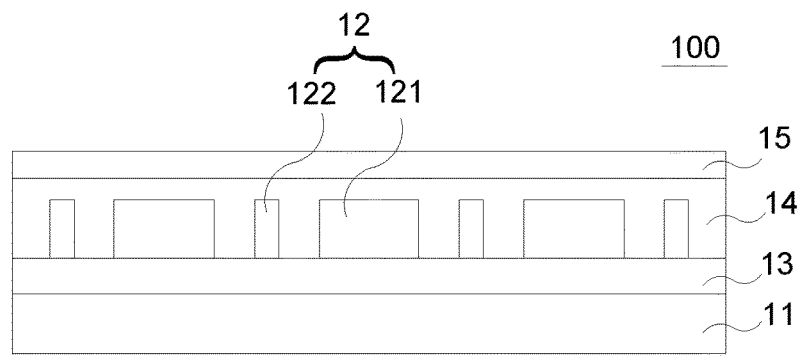
FIG. 18 is a schematic diagram of step B4 in a preparation method of privacy film according to an embodiment of the present application.

Referring to FIG. 18, a second adhesive layer 14 and a protective layer 15 are sequentially stacked on the grating 12.

Alternatively, the material of the second adhesive layer 14 is same as the material of the first adhesive layer 13. The second adhesive layer 14 is a transparent adhesive layer.

The preparation of the privacy film 100 of the embodiment of the present application is achieved.

Figure 19:
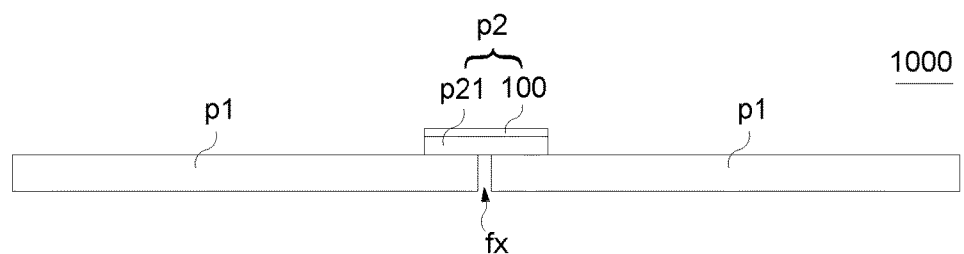
FIG. 19 is a schematic structural diagram of a splice panel according to an embodiment of the present application.

Accordingly, referring to FIG. 19, an embodiment of the present application further provides a splice panel 1000 including at least two first panels p1 and at least one second panel p2.

At least two first panels p1 are spliced together with a gap fx between two adjacent first panels p1.

The second panel p2 is disposed on the light-emitting surfaces of the two adjacent first panels p1 and shields the gap fx.

The second panel p2 includes a panel body p21 and a privacy film 100 as in any of the above embodiments. The privacy film 100 is disposed on the panel body p21. The side-view brightness of the panel body p21 is greater than the side-view brightness of the first panel p1.

The splicing direction of the two adjacent first panels p1 is intersected with the first direction m, to low the side-view brightness of the second panel p2. In a whole splice panel 1000, it is ensured that the side-view brightness of the second panel p2 is not zero.

Alternatively, the splicing direction of the first panel PI is perpendicular to the first direction m, such that the extending direction of the partial optical channel coincides with the splicing direction.

Figure 20:
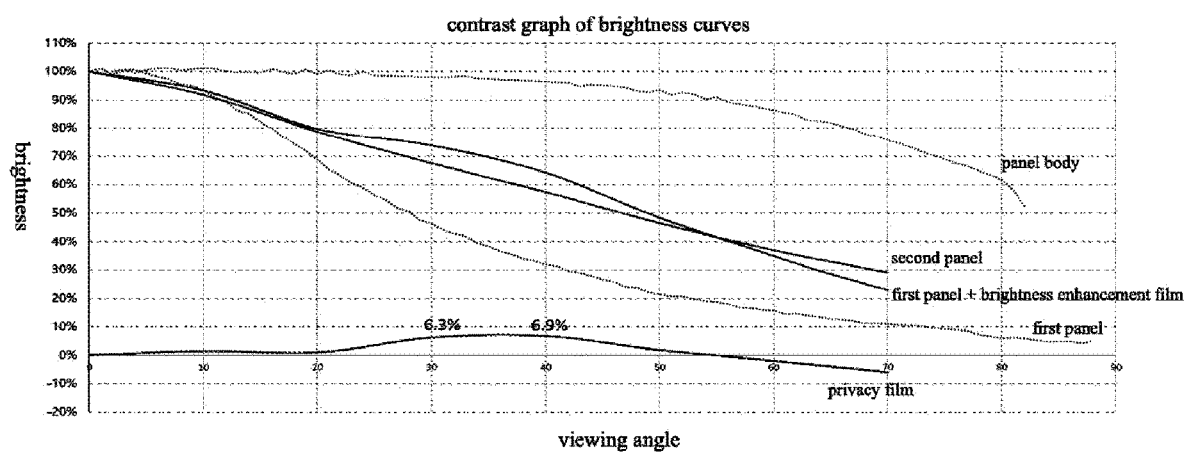
FIG. 20 is a curve graph of viewing angle-brightness of a first panel, a panel body, a first panel+a brightness enhancement film, a second panel (panel body+a privacy film), and a privacy film in a splice panel according to an embodiment of the present application.

In the second panel p2 of the splice panel 1000 according to the embodiment of the present application, the privacy film 100 is disposed on the panel body p21, so that the side-view brightness and the front-view brightness of the second panel p2 are reduced, and the side-view brightness and the front-view brightness of the whole splice panel 1000 tend to coincide, as shown in FIG. 20.

Alternatively, the first panel p1 may be, but is not limited to, a liquid crystal display panel. The light-emitting side of the first panel p1 may also be provided with a light-increasing film.

Alternatively, the second panel p2 may be a LED panel, such as a micro-led panel, a sub-millimeter level led panel (Mini-LED panel), a quantum dot led panel (Q-LED panel), or an organic light-emitting diode panel (OLED panel).

Figure 21:
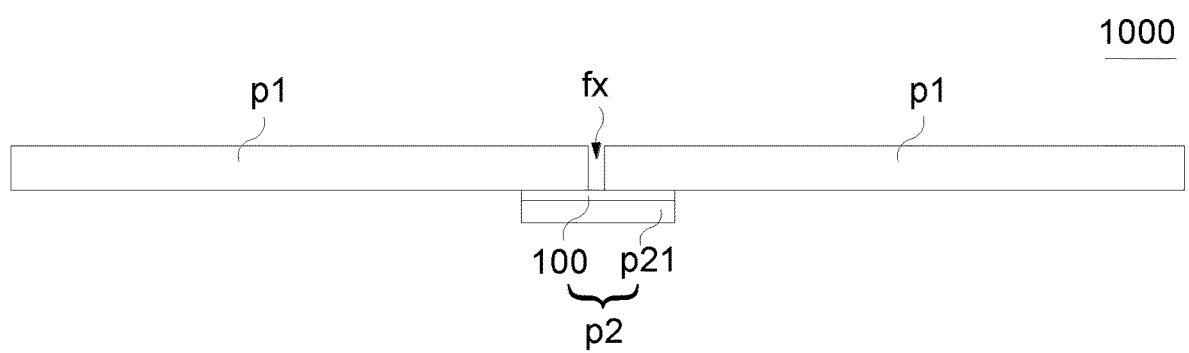
FIG. 21 is another schematic structural diagram of a splice panel according to an embodiment of the present application.

Referring to FIG. 21, in some embodiments, the second panel p2 may also be disposed on the light-entering surfaces of two adjacent first panels p1.

It should be noted that the light-entering surface is disposed opposite to the light-emitting surface. That is, the light-emitting surface is a front surface of the first panel p1, and the light-entering surface is a rear surface of the first panel p1.

Alternatively, the second panel p2 is disposed in a non-display area of the first panel p1. A part of the non-display area corresponding to the second panel p2 is transparent.

The second panel p2 is disposed on the rear surface of the first panel p1. Since the film layer of the non-display area portion of the first panel p1 has a certain light consumption, the light-emitting brightness of the second panel p2 is reduced, and the number of gratings 12 provided in the privacy film 100 is reduced, thereby reducing the difficulty in producing the privacy film.

The above describes in detail a privacy film, a preparation method thereof, and a splice panel provided by the embodiments of the present application. The principles and implementation of the present application are described by applying specific examples. The description of the above embodiments is only used to help understand the method and the core idea of the present application. At the same time, for those skilled in the art, according to the idea of the present application, there will be some changes in specific embodiments and application scope. In conclusion, the contents of the present specification shall not be construed as limiting the present application.

What is claimed is:

1. A privacy film, comprising:
a substrate; and
a plurality of gratings disposed on the substrate, wherein the plurality of gratings are spaced in a first direction and a second direction, and the first direction intersects the second direction;
wherein the plurality of gratings include a plurality of first gratings and a plurality of second gratings; the plurality of first gratings are spaced in the first direction and the second direction, and each of the plurality of first gratings extends in the first direction; the plurality of the second gratings are spaced in the first direction and the second direction, and each of the plurality of second gratings extends in the second direction; and
wherein each of the plurality of first gratings is connected to a corresponding one of the plurality of second gratings.

2. The privacy film of claim 1, wherein each of the plurality of gratings extends in the first direction.

3. The privacy film of claim 2, wherein the privacy film further comprises a connecting body, the connecting body is connected between two adjacent gratings in the first direction, and a thickness of the connecting body is less than a thickness of the grating.

4. The privacy film of claim 1, wherein a first opening is spaced between two adjacent first gratings in the first direction; and a second opening is spaced between two adjacent second gratings in the second direction;
wherein a plurality of first openings are arranged in the second direction to form a first optical channel; and a plurality of second openings are arranged in the first direction to form a second optical channel.

5. The privacy film of claim 1, wherein the first grating is spaced from the second grating.

6. The privacy film of claim 5, wherein a first opening is spaced between two adjacent first gratings in the first direction; and the second grating is disposed between two adjacent first openings in the second direction;
wherein a second opening is spaced between two adjacent second gratings in the second direction; and the first grating is disposed between two adjacent second openings in the first direction.

7. The privacy film of claim 6, wherein a width of a first opening is greater than a width of the second grating in the first direction;
wherein a plurality of first openings are arranged to form at least one first optical channel in the second direction.

8. The privacy film of claim 7, wherein a width of a second opening is greater than a width of the first grating in the second direction;

wherein a plurality of second openings are arranged to form at least one second optical channel in the first direction.

9. The privacy film of claim 8, wherein a plurality of hollowed-out regions are provided in areas where the first opening and the second opening overlap, the hollowed-out regions are arranged in a third direction to form a third optical channel, and the hollowed-out regions are arranged in a fourth direction to form a fourth optical channel;
wherein the first direction, the second direction, the third direction, and the fourth direction intersect each other.

10. The privacy film of claim 4, wherein a length of the first grating is equal to a length of the second grating, and a length of the first opening in the first direction is equal to a length of the first opening in the second direction.

11. The privacy film of claim 1, wherein the privacy film comprises a first region located in a middle region and a second region disposed on both sides of the first region, a density of the plurality of gratings located in the first region is less than a density of the plurality of gratings located in the second region, and/or heights of the plurality of gratings located in the first region are less than heights of the plurality of gratings located in the second region.

12. A preparation method of privacy film, comprising:
forming an adhesive layer on a substrate;
forming a grating material layer on the adhesive layer;
punching the grating material layer to form a plurality of first gratings, wherein the plurality of first gratings are spaced in the first direction and the second direction, and each of the plurality of first gratings extends in the first direction; and
punching the grating material layer to form a plurality of second gratings, wherein the plurality of the second gratings are spaced in the first direction and the second direction, and each of the plurality of second gratings extends in the second direction;
wherein each of the plurality of first gratings is connected to a corresponding one of the plurality of second gratings.

13. A splice panel, comprising:
at least two first panels, wherein the at least two first panels are spliced, and a gap is provided between two adjacent first panels; and
at least one second panel, wherein the at least one second panel is disposed on a light-emitting surface or light-entering surface of two adjacent first panels and shields the gap;
wherein the second panel includes a panel body and a privacy film disposed on the panel body; and a side-view brightness of the panel body is greater than a side-view brightness of the first panel;
wherein a splicing direction of two adjacent first panels intersects a first direction;
wherein the privacy film comprises:
a substrate;
a plurality of gratings disposed on the substrate, wherein the plurality of gratings are spaced in a first direction and a second direction, and the first direction intersects the second direction.

14. The splice panel of claim 13, wherein each of the plurality of gratings extends in the first direction.

15. The splice panel of claim 14, wherein the privacy film further comprises a connecting body, the connecting body is connected between two adjacent gratings in the first direction, and a thickness of the connecting body is less than a thickness of the grating.

16. The splice panel of claim 13, wherein the plurality of gratings include a plurality of first gratings and a plurality of second gratings, wherein the plurality of first gratings are spaced in the first direction and the second direction, and each of the plurality of first gratings extends in the first direction;
wherein the plurality of the second gratings are spaced in the first direction and the second direction, and each of the plurality of second gratings extends in the second direction.

17. The splice panel of claim 16, wherein the first grating is connected to the second grating.

18. The splice panel of claim 17, wherein a first opening is spaced between two adjacent first gratings in the first direction; and a second opening is spaced between two adjacent second gratings in the second direction;
wherein a plurality of first openings are arranged in the second direction to form a first optical channel; and a plurality of second openings are arranged in the first direction to form a second optical channel.

19. The preparation method of privacy film of claim 12, wherein each of the plurality of gratings extends in the first direction.

20. The preparation method of privacy film of claim 19, wherein the privacy film further comprises a connecting body, the connecting body is connected between two adjacent gratings in the first direction, and a thickness of the connecting body is less than a thickness of the grating.

* * * * *